(12) United States Patent  (10) Patent No.: US 6,500,543 B2
Sakai  (45) Date of Patent: Dec. 31, 2002

(54) ARTIFICIAL STONE MOLDED PRODUCT

(75) Inventor: Mieko Sakai, Tokyo (JP)

(73) Assignee: Doppel Co., Ltd., Tokyo (JP)

( * ) Notice: Subject to any disclaimer, the term of this patent is extended or adjusted under 35 U.S.C. 154(b) by 0 days.

(21) Appl. No.: 09/849,224

(22) Filed: May 7, 2001

(65) Prior Publication Data

US 2001/0021436 A1 Sep. 13, 2001

Related U.S. Application Data

(63) Continuation of application No. 09/180,224, filed as application No. PCT/JP97/00680 on Mar. 5, 1997, now abandoned.

(51) Int. Cl.7 .................................................. B32B 9/00
(52) U.S. Cl. ........................ 428/406; 428/403; 428/404; 428/15; 428/690; 428/913; 428/168; 52/316; 40/542; 40/543; 40/800; 264/1.7; 264/21; 264/171.1; 264/212; 264/241; 264/299
(58) Field of Search ............................... 52/316, 311.1; 40/542, 543, 800, 124.5; 428/690, 15, 168, 403, 913, 404, 406, 325, 336; 264/21, 1.7, 171.1, 212, 241, 299, 308

(56) References Cited

FOREIGN PATENT DOCUMENTS

| JP | 60-137862 | 7/1985 |
| JP | 8-302629 | 11/1996 |
| JP | 8-338009 | 12/1996 |
| JP | 9-25617 | 1/1997 |
| JP | 11-117211 | 4/1999 |

*Primary Examiner*—Archene Turner
*Assistant Examiner*—Wendy Boss
(74) *Attorney, Agent, or Firm*—Wenderoth, Lind & Ponack, L.L.P.

(57) ABSTRACT

Provided is an artificial stone molded product in which protrusions or embedded grooves for a figure or a pattern are provided integrally on or in a flat surface of a substrate, and a main composition comprises an aggregate of an inorganic material and a resin, characterized in that at least a part of the above-mentioned protrusions or embedded grooves are luminous or fluorescent, light-emitting portions which contain a luminous or fluorescent material having a luminescence or a luminousness accompanied by ultraviolet absorption and an aggregate of a transparent inorganic material, or an aggregate of a transparent inorganic material having a surface baked with the above-mentioned luminous or fluorescent material as at least a part of the aggregate of the inorganic material.

24 Claims, 4 Drawing Sheets

ARTIFICIAL STONE MOLDED PRODUCT

This application is a continuation of U.S. Ser. No. 09/180,224, filed Jun. 16, 1999, now abandoned, which is a 371 application of PCT/JP97/00680, filed Mar. 5, 1997.

TECHNICAL FIELD

The invention of the present application relates to an artificial stone molded product. More specifically, the invention of the present application relates to an artificial stone molded product which has a night decorativeness, a luminousness such as a luminescence and a light-emitting property accompanied by ultraviolet absorption and which is useful in a building material or a sight material as a direction indicator or a position guide using light in dark surroundings.

BACKGROUND ART

An artificial stone obtained by pulverizing a natural stone and mixing the pulverizate with a resin or the like for solidification has been so far known. And regarding this artificial stone, various attempts have been made to provide a product having a tone of a natural stone such as marble, granite or the like and being excellent in a hardness and a strength.

As an approach to improve properties and a performance of such an artificial stone, there has been also a proposal of imparting a light function using a luminous material such as a luminescent material or a fluorescent material such as an ultraviolet light-emitting material which emits light through ultraviolet absorption. This approach is conducted by mixing a fluorescent material with a resin component as a binder of an artificial stone for solidification or by mixing a luminescent fluorescent material such as strontium aluminate or the like or a ultraviolet fluorescent material with an unsaturated polyester, a methacrylic resin, a glass or the like for solidification, pulverizing the mixture, and using the resulting product as an aggregate to form an artificial stone.

However, in the case of the conventional luminous or fluorescent artificial stone, there were defects that in either of the above-mentioned methods, it is only in the position where the binder resin component or the aggregate exposed to the surface of the artificial stone is arranged that the luminescent material or the like gives the fluorescent function and the luminescent material or the like contained in the artificial stone molded product does not act at all in portions other than the above-mentioned. A fluorescent material such as a luminescent material or the like is quite expensive, and even the addition of the same in a small amount increases the overall cost to from 3 to 10 times. Accordingly, the ordinary artificial stone containing therein a fluorescent material free from this function was not practical in view of the cost.

Further, a luminous layer formed of a luminescent material on a surface of an artificial stone has been so far mostly spread throughout the surface. Accordingly, for example, a product is not one in which only a guide figure or a guide pattern indicating a direction or a position which is required in dark surroundings at night is formed of a luminous layer.

Meanwhile, it has also been studied that only a guide figure or a guide pattern is formed of a luminous layer as mentioned above. However, in the case of the ordinary luminous layer, an adhesion with a substrate is poor, and the luminous layer itself has a poor abrasion resistance. Accordingly, there has been a problem that especially in the application to a floor, a predetermined function is not provided owing to delamination, dropping, abrasion and the like of the luminous layer.

For this reason, there have been so far problems that the application and the design of the luminous artificial stone are quite limited owing to a high cost and restrictions of a luminousness and physical properties.

It has been therefore required to realize a new artificial stone molded product which is excellent in a luminousness as well as in an adhesion integrity with a substrate of a luminous layer and physical properties such as an abrasion resistance and the like, which has a luminousness or a fluorescence and which is useful as a light guide or a night decorative material in dark surroundings, while decreasing the cost of the product upon using a luminous or fluorescent material such as a luminescent material or the like only in a figure or a patter required.

DISCLOSURE OF INVENTION

In order to solve the above-mentioned problems, the invention of the present application provides an artificial stone molded product in which protrusions or embedded grooves for a figure or a pattern are provided integrally on or in a flat surface of a substrate, and a main composition comprises an aggregate of an inorganic material and a resin, characterized in that at least a part of the above-mentioned protrusions or embedded grooves are luminous or fluorescent light-emitting portions which contain a luminous or fluorescent material having a luminescence or a luminousness accompanied by ultraviolet absorption and an aggregate of a transparent inorganic material, or an aggregate of a transparent inorganic material having a surface baked with the above-mentioned luminous or fluorescent material as a part of the aggregate of the inorganic material.

The present invention further provides a process for producing the above-mentioned artificial stone molded product.

BEST MODE FOR CARRYING OUT THE INVENTION

The invention of the present application is described in more detail below.

Figure 1:
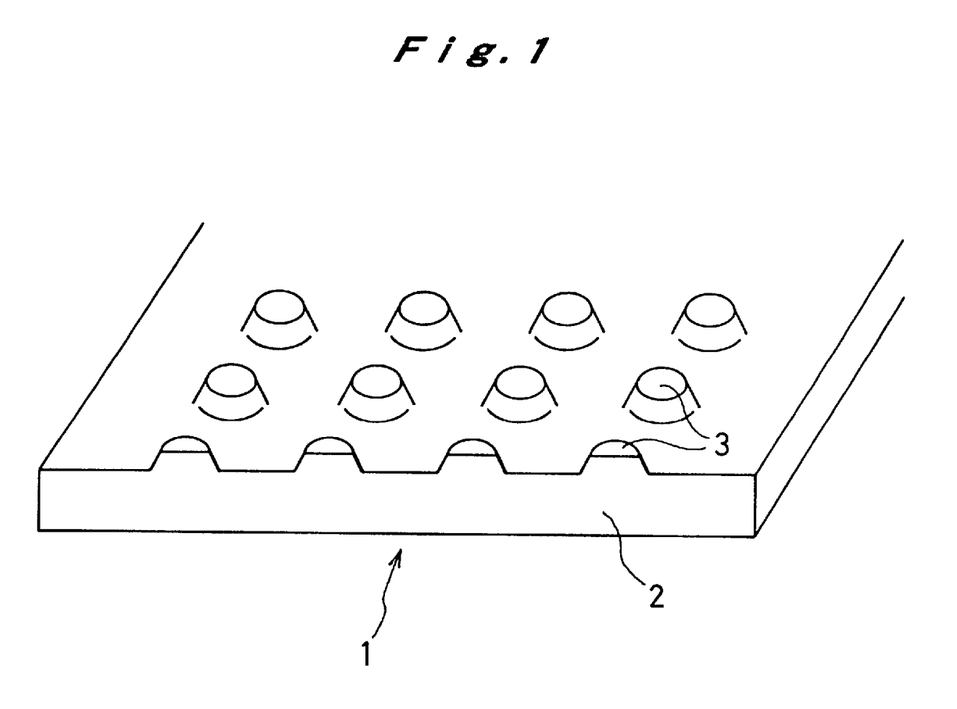
FIGS. 1 and 2 of the drawings attached are each a sectional view showing a structure of an artificial stone in the present invention.
Figure 2:
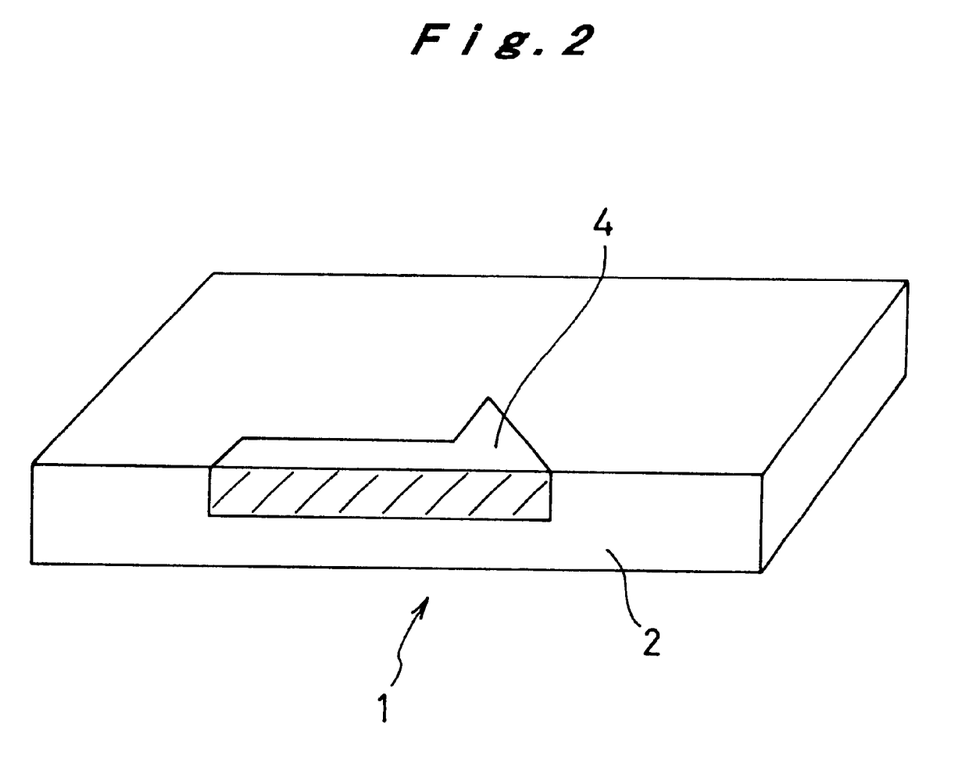

The artificial stone molded product intended by the present invention can be described by referring to, for example, FIGS. 1 and 2 of the drawings. In the case of FIG. 1, an artificial stone molded product (1) has protrusions (3) on a flat surface of a substrate (2), and the protrusions (3) are arranged and formed to give a predetermined figure or pattern. And this protrusion (3) is a luminous or fluorescent light-emitting portion having a luminescence or a luminousness accompanied by ultraviolet absorption. The substrate (2) itself does not form such a light-emitting portion.

In the case of FIG. 2, the substrate (2) is provided with embedded grooves (4) having embedded therein light-emitting portions.

The protrusion (3) as light-emitting portions, as shown in FIG. 1, can have, for example, a function of a braille block in the daytime and a function of a mark for a guide of a direction or a position in dark surroundings at night. In the case of FIG. 2, it is likewise useful as a mark for a guide. Of course, a decoration at night or the like can also be provided.

As stated above, it is an object of the present invention that only the protrusions (3) and the embedded grooves (4) can selectively become light-emitting portions. In the conventional art, this was quite difficult. It was largely because the adhesion integrity between the substrate and the light-emitting portions is poor and the light-emitting portions themselves have a poor abrasion resistance.

The present invention is to provide, upon conquering such defects of the conventional art, an artificial stone molded product which enables the cost to decrease by the selective formation of light-emitting portions and which prevents delamination, dropping and abrasion.

With respect to the composition of the artificial stone, in the present invention, it contains an aggregate of an inorganic material and a resin as basic components in the substrate (2), the protrusions (3) and also the embedded grooves (4) in FIGS. 1 and 2. In this instance, the aggregate of the inorganic material includes a wide variety of materials such as a natural stone, a natural mineral, a synthetic inorganic material, a glass, a metal and the like.

And what is important in the present invention is that a luminous or fluorescent material and an aggregate of a transparent inorganic material or an aggregate of a transparent inorganic material having a surface layer coated with a luminous or fluorescent material is contained in at least a part of the aggregate of the inorganic material in the light-emitting portions constituting the above-mentioned protrusions (3) or the embedded grooves (4).

When the light-emitting portion contains the aggregate of the transparent inorganic material along with the luminous or fluorescent material, it is indispensable that the weight ratio of both materials is between 1:2 and 1:10 and the sum of both materials is between 80 and 95% by weight based on the overall composition of the light-emitting portion.

Further, when the light-emitting portion contains the aggregate of the transparent inorganic material having the surface coated with the luminous or fluorescent material, it is indispensable that the weight ratio of this material is between 5 and 65% by weight based on the overall composition of the light-emitting portion.

The above-mentioned requirements are defined in view of physical properties such as a delamination resistance, a drop resistance, an abrasion resistance and the like, and a luminousness.

As the aggregate of the inorganic material, a combination of the following two types is preferable. That is, one is a fine powder component of an inorganic material having a size of from 5 to 70 mesh. This is a fine powder component of an appropriate inorganic material selected from minerals such as silica rock, chrysolite, feldspar, pyroxene, mica and the like, natural stones such as granite, metamorphite and the like, porcelain, glasses, metals and the like.

And along with this fine powder component, a finely divided component having a size of 100 mesh-under is preferably used. As this finely divided component, various natural or artificial finely divided components are mentioned. For example, powders of calcium carbonate, aluminum hydroxide and silica rock are easily obtainable finely divided components.

Further, as a part of this finely divided component, a component such as manganese dioxide, titanium dioxide, zirconium silicate, iron oxide or the like to adjust a color tone, or a component such as antimony trioxide (pentoxide), a boron compound, a bromine compound or the like to impart a flame retardance and an incombustibility may be blended.

The above-mentioned fine powder component acts as a main factor of an appearance and physical properties of the resulting artificial stone molded product. The size of the finely divided component is much smaller than the 100 mesh level in comparison to the fine powder component. The finely divided component enters between the individual particles of the fine powder component and is arranged to fill the space between the particles, contributing toward providing properties such as a hardness and a pliability of the resulting artificial stone. The weight ratio of the fine powder component and the finely divided component is preferably between 0.5:1 and 5:1, more preferably between 1:1 and 4:1. When the artificial stone molded article of the present invention is formed of a combination of the fine powder component and the finely divided component, the structure of the light-emitting portion can be considered as follows.

<A> When the luminous or fluorescent material and the aggregate of the transparent inorganic material are used as a part of the aggregate of the inorganic material, it is advisable that the component of the transparent inorganic material is used as at least a part of the fine powder component and the luminous or fluorescent material is used as at least a part of the finely divided component.

The fine powder component as the aggregate of the transparent inorganic material refers to a component of an inorganic material having substantially a high light transmission. The transparency thereof includes various degrees. A natural or synthetic inorganic material having a relatively high light transmission is to be used in the present invention. Consequently, the fine powder component of the transparent inorganic material may be colored or have a peculiar color.

Quartz, silica rock, a glass and the like are typically mentioned in the present invention as the fine powder component of the transparent inorganic material. However, it is not limited thereto.

And the artificial stone molded product of the present invention contains, as a part of the finely divided component, a luminous or fluorescent component having a luminescence or a luminousness accompanied by ultraviolet absorption and having a size of 100 mesh-under. Typical examples of such a component include a strontium aluminate luminescent material, zinc sulfide and the like. These materials are used in the present invention.

The fine powder component of the inorganic material which plays a roll as an aggregate of an artificial stone has a size of from 5 to 70 mesh as mentioned above, and this is an indispensable requirement in the combination with the finely divided component of the inorganic material. And the above-mentioned luminous or fluorescent component plays the same roll as the finely divided component, and imparts the light function such as the luminousness or the fluorescence to the artificial stone. It is also indispensable that the size of the luminous or fluorescent component is 100 mesh-under as in the finely divided component.

With respect to each of the above-mentioned components of the inorganic materials, the mixing ratio is an important requirement along with its size.

That is, in the composition of the artificial stone of the present invention, the relationship of the weight ($W_1$) of the above-mentioned fine powder component of the inorganic material, the weight ($W_2$) of the finely divided component of the inorganic material and the weight ($W_3$) of the luminous or fluorescent component is preferably as follows.

$W_1$: ($W_2$+$W_3$)=0.5:1 to 5:1

$W_2$: $W_3$=1:2 to 10:1

With respect to $W_1 : (W_2 + W_3)$, it is preferably between 1:1 and 4:1. With respect to $W_2 : W_3$, it is preferably between 1:1 and 5:1.

And in the fine powder component of the inorganic material, as mentioned above, it is advisable that the ratio of the fine powder component of the transparent inorganic material therein has preferably the following relationship $(0.5 \text{ to } 1.0)W_1$.

The above-mentioned facts are required to realize physical properties as an artificial stone, such as a strength, a hardness, a density and the like, and a light function such as a luminousness or a fluorescence.

Specifically, the size of each component is selected, as required, depending on a size and a mixing ratio of each component used in combination. Generally, it is preferable that the size of the finely divided component and the luminous or fluorescent component is between 150 and 250 mesh.

The light function of the artificial stone is further described. With respect to the artificial stone of the present invention, the light function of the luminous or fluorescent artificial stone is realized in such a manner that 1) from 30 to 100% by weight of the fine powder component of the inorganic material is a fine powder of a transparent inorganic material, and 2) a luminous or fluorescent component of 100 mesh-under is mixed at the above-mentioned specific ratio. And the characteristic feature in this case is that light can be emitted as light having a thickness. It is not that light is emitted in the surface layer alone as in the prior art, but that light is emitted in the overall thickness of an artificial stone. Thus, the product is excellent in the luminousness and the economics in view of the use of an expensive luminous or fluorescent component.

The reason is as follows. The use of the fine powder component of the transparent inorganic material as a transparent aggregate permeates light emitted from outside into the inside of the artificial stone to efficiently absorb the light energy in the luminous or fluorescent component, and the luminous layer having dispersed therein the luminous or fluorescent component formed of the luminescent material or the like is secured as a great thickness including the inside of the artificial stone, so that a high luminosity can be maintained for a long period of time. In the light emission, the fine powder component of the transparent inorganic material comes to have a high luminosity because it is good in a light transmission.

The ratio of the transparent component occupied in the overall fine powder component is, as mentioned above, between 30 and 100% by weight. Naturally, in some physical properties of an artificial stone, such as a strength and the like and some external design, a ratio of 100% is preferable from the standpoint of a light function. of course, this is not critical. However, when it is less than 30% by weight, a desired light function is hardly provided.

<B> When the aggregate of the transparent inorganic material having the surface baked with the luminous or fluorescent material is used as a part of the aggregate of the inorganic material, it can be used such that at least a part of the fine powder component is transparent, and it has the surface baked with the luminous material having a luminescence or the like or the fluorescent material having a luminousness accompanied by ultraviolet absorption. That is, a part or the whole of the fine powder component is the aggregate of the transparent inorganic material having the surface coated with the luminous material or the fluorescent material. Appropriate examples of such an aggregate of the inorganic material having the transparent light include a glass, silica rock and the like.

Regarding the fine powder component incorporated in the composition, it is advisable that the ratio (weight) of from 10 to 100% is used in the above-mentioned aggregate of the transparent inorganic material having the surface layer coated with the above-mentioned luminous or fluorescent material.

In the aggregate of the transparent inorganic material, especially, the baked coating of the fine powder component, a coating having a thickness of from several micrometers to several tens of micrometers, for example, from 5 to 50 $\mu$m, preferably from 20 to 40 $\mu$m is applied to the surface of the particle in the transparent fine powder component. More specifically, the coating is applied by the baking at a high temperature of from 120 to 1,200° C.

The fluorescent material to be baked can include various fluorescent materials which have a luminescence or which emit light through ultraviolet-light irradiation, such as strontium aluminate, zinc sulfide and the like.

The baking is conducted not by various known methods, but by mixing the aggregate of the transparent inorganic material, for example, the above-mentioned fine powder component with a dispersion or a paste having dispersed therein a fine powder of a luminescent material such as strontium aluminate or the like and drying the mixture.

In the present invention, it is advisable that the fine powder component of the inorganic material has the specific size as noted above. That is, the fine powder component of the inorganic material has a size of from 5 to 70 mesh as mentioned above. When an upper or lower portion is colored dark using the colored and colorless materials, it is considered that the size of fine particles is changed depending on the colored or colorless condition. However, fine particles which are extremely different in the size shall not be used in large amounts because they deteriorate the strength of the product.

Meanwhile, the size of particles of the finely divided component is 100 mesh-under as noted above. The particles of the finely divided component have to be fully incorporated between the particles of the fine powder component. More specifically, the size is preferably between 150 and 250 mesh.

And what is important in the high-density artificial stone of the present invention is that the aggregate components of these inorganic materials are preferably dispersed uniformly in any portions of the product except in special cases.

Further, the resin component can be selected from a wide variety of thermosetting materials.

For example, an acrylic resin, a methacrylic resin and an unsaturated polyester resin are mentioned. Of these, the methacrylic resin is preferable in view of a transparency, a hardness, a strength and the like. The ratio of the resin component is preferably less than 15% by weight, further preferably 10% by weight or less based on the total composition. This resin component contributes to covering the fine powder component and the finely divided component which are components forming the above-mentioned structure to bind the whole body, and functions to impart a resilience or a tensile strength to a product when an artificial stone is completed. The ratio of the aggregate of the inorganic material formed of the fine powder component and the finely divided component is limited. That is, it has to be 85% by weight or more, preferably 89% by weight or more. When it exceeds 95%, the product becomes brittle and is hard to use. When it is less than 85%, the product becomes too soft to give qualities as a stone. Thus, the product is used in the same range as a resin plate.

This means that the component other than the fine powder component and the finely divided component such as a natural stone and the like, namely, the resin component should not be present in the product in an amount exceeding 15% by weight.

When the amount of the resin component exceeds 15%, the product is like plastics, and it is only seemingly an artificial stone. Further, when the amount of the resin component is excessively decreased, a product comes to have an appearance close to a natural color, but it becomes brittle and is unsuitable for actual use. From this standpoint, the amount of the resin component is more preferably between 5 and 11% by weight.

In practicing the present invention, the ratios of these components are important. Especially important is a ratio of the resin component to the other component. In the present invention, one of the characteristic features is that a high-density product having a dense texture can be provided. The high density here referred to means that the fine powder component and the finely divided component contained in the artificial stone product are present in a high density. For example, this density is 2.2 g/cm$^3$ or more which exceeds the range in the conventional artificial stone.

It is advisable that the outer surface of the product is polished or roughened. In practice, it is preferable that the broken fine powder component is exposed.

The polishing is a practically convenient method for exposing the dense texture condition inherent in the high-density artificial stone having a deep atmosphere in the present invention. It is, of course, possible that a part of a surface of a product is polished to expose the fine powder component and a difference with another portion in the same surface is used as a pattern.

Further, when an artificial stone is obtained, it is an important problem what a desired color or design is. Granite or marble is one goal because a product formed of a natural stone is hardly obtained and a color and a glaze thereof are beautiful. In the present invention, the transparent component is used as the fine powder component, making it possible to obtain a product having a glaze of granite, marble or the like. This is because a fine powder obtained by pulverizing a quartz-type natural stone is used as the fine powder component.

The fine powder obtained by pulverizing the quartz-type natural stone is colorless and transparent in many cases. In a non-transparent powder, a transparent often remains slightly.

It is also possible to provide a uniform color and a deep, glazed peculiar tone of color by adding an inorganic pigment, an organic pigment such as an azo pigment or a phthalocyanine pigment, or various dyes.

In the composition of the artificial stone in the present invention, the product can also be colored by using colored particles having the same size as the fine powder component, as a color component.

In any case, the color reproducibility can be secured quite easily in comparison to the conventional artificial stone, and a product which is excellent in a dept and a glaze without discoloration can be obtained.

The high-density artificial stone of the present invention having usually excellent color tone characteristics along with a luminescence, a ultraviolet light-emitting property and the like can have any form, examples of the form being a plate, a bar, a cylinder and the like.

The above-mentioned artificial stone molded product of the present invention can be produced by, for example, the following process.

Figure 3:
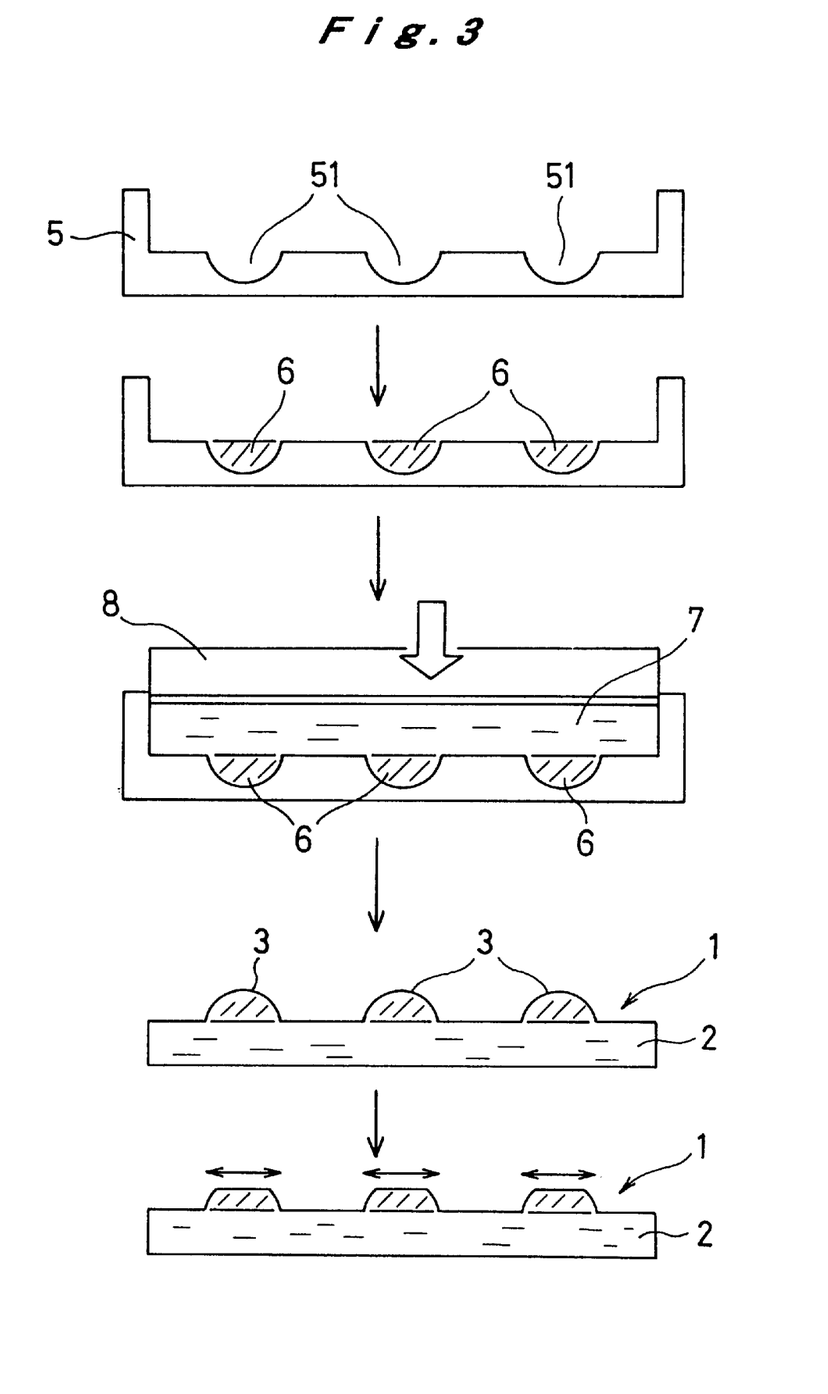
FIGS. 3 and 4 are each a flow chart of a process for producing the same in the present invention.

<I> Molded product in which protrusions are light-emitting portions:

FIG. 3 is a flow chart showing a typical process for producing an artificial stone molded product (1) in which protrusions (3) are light-emitting portions.

That is, this FIG. 3 shows a process for producing an artificial stone molded product in which protrusions (3) for a figure or a pattern are integrally provided on a flat surface of a substrate (2), a main composition comprises an aggregate of an inorganic material and a resin, and at least a part of the protrusions (3) are luminous or fluorescent light-emitting portions, which comprises injecting a mixture (6) for resin molding containing a luminous or fluorescent material having a luminescence or a luminousness accompanied by ultraviolet absorption and an aggregate of a transparent inorganic material or an aggregate of a transparent inorganic material having a surface baked with the luminous or fluorescent material as at least a part of the aggregate of the inorganic material into grooves (51) of a mold (5) which correspond to the protrusions (3) of the molded product and which are formed in the inner bottom surface, then injecting a mixture (7) for resin molding containing an aggregate of an inorganic material into the mold (5), press-curing the mixture, withdrawing the product from the mold, and further polishing the product or roughening the product using a water jet or the like as required to produce an artificial stone molded product (1) having light-emitting portions in the protrusions (3) alone.

In the curing upon fitting a male mold (8), the compression is conducted by pressing with a surface pressure of, for example, from 5 to 100 kgf/cm$^2$. In this molding, heating is conducted at a temperature of from approximately 90 to 140° C. for from 5 to 20 minutes in the compression.

The mixture (6) for resin molding which forms the light-emitting portions as the protrusions (3) and the mixture (7) for resin molding which forms the substrate (2) are integrally molded in the above-mentioned curing step by the compression. Accordingly, delamination or dropping of the light-emitting protrusions (3) does not occur. Besides, the protrusions (3) are also formed as having an excellent abrasion resistance due to its composition.

This process using such a compression molding exhibits a mass-production effect as a process for producing a product with a relatively simple shape, such as a flat molded product, and there is almost no loss of a material, so that this process is economically excellent too.

A means for surface polishing is not particularly limited. It can be conducted using a tool such as a grindstone, a polishing cloth, a polishing belt or the like, or a polishing agent such as a buff polishing agent, a rubbing compound or the like.

As the polishing agent, diamond, boron carbide, corundum, alumina and zirconia which have mainly a polishing action, and tripoli, dromite, alumina, chromium oxide and cerium oxide which have mainly a scratching action are used as required.

And in the present invention, the surface of the molded product after the molding may be roughened to expose the finely divided component to the surface portion.

To this end, a method of selectively removing the resin component is employed. That is, it is effective, for example, that after the product is removed from the mold, high-pressure water is jetted on the surface of the molded product to conduct the texture treatment.

Since this treatment varies depending on various conditions such as a thickness, a distance from a nozzle, a treatment mode and the like, it is not limitative. However, usually, in the case of a thickness of from 2 to 20 cm, a water pressure of from 50 to 1,400 kg/cm$^2$ can be applied from a height of a nozzle of from 2 to 50 cm. This water pressure is far lower than when a natural stone is used.

That is, this is because the high-quality treatment can be conducted more easily by the presence of a resin component.

A nozzle for jetting high-pressure water or its system is not particularly limited. Various types are employable.

The surface is flattened or roughened using the water jet in the texture treatment to produce an artificial stone having a deep quality.

The presence of the resin component does not make the surface cloudy, and makes easy the treatment of a waste water in comparison to an etching method using chemicals.

Naturally, the surface can be treated with an organic solvent as required to soften or melt the resin component and partially remove the same.

In this case, the organic solvent corresponding to the resin component may be selected. Examples thereof include halogenated hydrocarbons such as methylene chloride and chloroform, carboxylic acids and esters thereof such as acetic anhydride, ethyl acetate and butyl acetate, acetone, tetrahydrofuran, DMF and DMSO.

The molded product is dipped in these organic solvents or these organic solvents are sprayed thereon or caused to flow down thereon to remove the resin component softened or melted from the surface whereby the uneven surface can be formed.

Alternatively, the uneven surface may be formed by scratching the resin component having a low hardness from the surface with a wire brush, a cutting means or the like.

The surface is roughened by the above-mentioned various means, and the texture is treated. Then, the resulting surface is polished as noted above to realize the peculiar deep, glazed surface.

Figure 4:
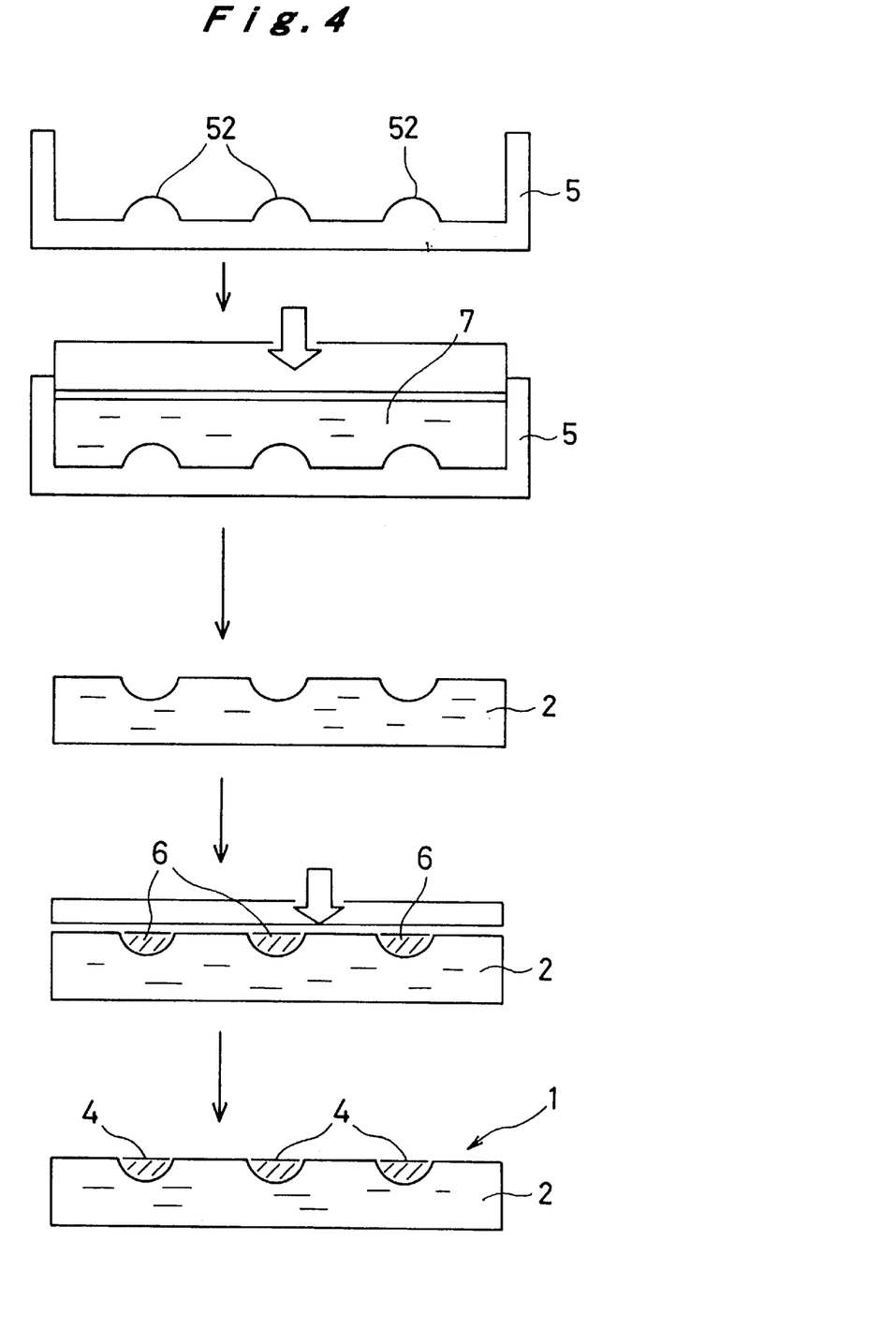

<II> Molded product in which embedded grooves are light-emitting portions:

FIG. 4 is a flow chart showing a typical process for producing an artificial stone molded product (1) in which embedded grooves (4) are light-emitting portions.

That is, this FIG. 4 shows a process for producing an artificial stone molded product in which embedded grooves (4) for a figure or a pattern are integrally provided in a flat surface of a substrate (2), a main composition comprises an aggregate of an inorganic material and a resin, and luminous or fluorescent light-emitting portions are embedded in at least a part of the embedded grooves (4), which comprises injecting a mixture (7) for resin molding containing an aggregate of an inorganic material into a mold (5) having protrusions (52) corresponding to the embedded grooves (4) of the molded product in the inner bottom surface, curing or half-curing the mixture, withdrawing the resulting product from the mold, injecting a mixture (6) for resin molding containing a luminous or fluorescent material having a luminescence or a luminousness accompanied by ultraviolet absorption and an aggregate of a transparent inorganic material or an aggregate of a transparent inorganic material having a surface baked with the luminous or fluorescent material as at least a part of the aggregate of the inorganic material into grooves formed in the surface of the molded product to produce an artificial stone molded product (1) having the light-emitting portions in the embedded grooves (4) alone.

In this process as well, the curing by compression molding can be conducted in the above-mentioned manner, and the surface of the molded product (1) is likewise finally polished or roughened as required. The mixtures (6), (7) for resin molding are also integrated.

For example, when the aggregate of the transparent inorganic material having the surface coated with the luminous or fluorescent material is used as the mixture (6) for resin molding in either process, the sections of the particles and the coating layer are exposed by treatment such as polishing or the like.

In this manner also, an artificial stone which is excellent in light-emitting characteristics, a texture and qualities is produced.

That is, for example, when a luminescent or ultraviolet light-emitting material is baked and coated on the surface of the fine powder component, the particles of the fine powder component and the coating thereof are exposed as sections by polishing the surface of the artificial stone. Consequently, light irradiated from outside is entered from the exposed particle surface of the transparent fine powder and reaches the baked coating material in the inside.

In the case of a highly transparent methacrylic resin or the like, the light transmission is rendered wholly good.

For this reason, incident light is transmitted into the inside of the light-emitting portion, and light is also emitted from inside.

Accordingly, light can be stored in a short period of time, and a light-emitting efficiency is also increased.

The present invention is illustrated by referring to the following Examples. Naturally, the present invention is not limited to the following Examples.

EXAMPLE

Example 1

An artificial stone molded product was produced according to a process shown in FIG. 3.

That is, a mixture (6) for resin molding having the following formulation was injected into grooves (51) having a depth of 6 nm in a mold (5).

Silica rock of from 10 to 50 mesh in which 60% by weight a surface layer baked with a strontium aluminate luminescent material at approximately 1,000° C. was formed to a thickness of approximately 30 μm Silica rock powder having an average 30% by weight particle diameter of 250 mesh Methyl methacrylate (MMA) (containing 10% by weight 0.15% of a peroxide-type curing agent)

Subsequently, a mixture (7) for resin molding having the following formulation was injected into the mold (5). Silica rock of from 10 to 70 mesh 20% by weight Silica rock of from 10 to 70 mesh having 42% by weight on the surface a baked layer of a yellow pigment with a thickness of 30 μm Aluminum oxide powder having an average 30% by weight particle diameter of 225 mesh Methyl methacrylate (MMA) (containing 8% by weight 0.15% of a peroxide-type curing agent)

An upper mold (8) was placed thereon, and the mixture was pressed and cured at a temperature of 120° C. and a pressure of 12 kgf/cm$^2$ for 20 minutes.

Then, the product was withdrawn from the mold to obtain an artificial stone molded product (1) in which the thickness of the substrate (2) was 20 mm and the height of each of the protrusions (3) was 6 mm.

With respect to this molded product (1), the surface of the protrusion (3) was adjusted to a height of 5 mm by polishing the same with a diamond grindstone.

In the resulting molded product (1), the protrusion (3) polished had a light-emitting property such as a luminousness, and exhibited an excellent performance as a position guide mark in dark surroundings. Further, the substrate (2) had an excellent decorativeness as a deep yellow plate, was beautiful even in the daytime and could be used also as a braille block for a blind person.

In a test according to JIS K-7112, the specific gravity was 2.30. Further, the water absorption was 0.14%. With respect to the properties in the protrusions (3) in a region where the substrate (2) and the protrusions (3) were integrated, the hardness, the abrasion resistance and the like were excellent as shown in Table 1.

TABLE 1

| Item | Results | Test conditions |
| --- | --- | --- |
| Bending strength | 63.55 kgf/cm | according to JIS A5209 |
| Compression strength | 1380 kgf/cm$^2$ | Crosshead speed 0.5 mm/min Load cell 2 tons |
| Impact strength | 4.57 kgf · cm/cm$^2$ | Pendulum impact test |
| Hardness | 1020 kgf/mm$^2$ | Vickers hardness according to JIS Z-2244 |
| Abrasion resistance | 0.01 g | JIS A-5209 sand dropping-type abrasion test |

Further, no abnormality was observed even in tests for an acid resistance and an alkali resistance by the dipping in a 3% hydrochloric acid aqueous solution for 8 hours and the dipping in a 3% sodium hydroxide aqueous solution for 8 hours.

Example 2

The molding was conducted in the same manner as in Example 1, using a mixture (6) for resin molding having the following formulation.

Silica rock of from 10 to 50 mesh in which 50% by weight a surface layer baked with a strontium aluminate luminescent material at approximately 1,000° C. was formed to a thickness of approximately 30 μm Silica rock powder having an average 20% by weight particle diameter of 250 mesh Powder of a strontium aluminate 20% by weight luminescent material having an average particle diameter of 220 mesh Methyl methacrylate (MMA) (containing 10% by weight 0.2% by weight of a peroxide-type curing agent)

The protrusions (3) were polished using a diamond grindstone and a silicon carbide magnesia grindstone. Further, the resin portion alone in the surface portion was removed at a water jet pressure of 1,200 kg/cm$^2$ (nozzle diameter 0.8 mm, a jet distance 35 mm).

The resulting artificial stone had a,Depth and a non-slip property in the daytime, and could be seen in the overall thickness direction at night for a long period of time because of the luminescence.

It could be used as a luminous guide mark building material in urgent power failure and thus as an effective artificial stone.

Example 3

The molding was conducted in the same manner as in Example 1, using a mixture (6) for resin molding having the following formulation.

| Silica rock of from 10 to 60 mesh | 60% by weight |
| --- | --- |
| Aluminum hydroxide powder having an average particle diameter of 220 mesh | 22% by weight |
| Strontium aluminate luminescent material having an average particle diameter of 200 mesh | 10% by weight |
| Methyl methacrylate (MMA) (containing 0.15% of a peroxide-type curing agent) | 8% by weight |

Likewise, a molded product which was excellent in physical properties and a luminousness was obtained.

Example 4

An artificial stone molded product having a thickness of 16 mm in which embedded grooves (4) having a depth of 4 mm were light-emitting portions was obtained by the process in FIG. 4, using the mixtures (6), (7) for resin molding in Example 1.

The surface was polished by means of a diamond grindstone.

A molded product which was excellent in physical properties and a luminousness was obtained.

Industrial Applicability

As stated above, the present invention provides a high-density artificial stone which was excellent in light properties such as a luminousness and the like, which had a deep, glazed, excellent tone of color, which was free from problems such as delamination, dropping, abrasion and the like of light-emitting portions and which had good physical properties. Besides, the production of such an excellent product is realized at far lower costs than the ordinary product.

What is claimed is:

1. An artificial stone molded product in which protrusions or embedded grooves for a figure or a pattern are provided integrally on or in a flat surface of a substrate, and a main composition of the stone molded product comprises an aggregate of an inorganic material and a resin, wherein at least a part of said protrusions or embedded grooves are luminous or fluorescent light-emitting portions which contain an aggregate of a transparent inorganic material having a surface baked with a luminous or fluorescent material, having a luminescence or a luminousness accompanied by ultraviolet absorption, as at least a part of the aggregate of the inorganic material, wherein the aggregate of the transparent inorganic material baked with the luminous or fluorescent material is contained in the light-emitting portions at a ratio of from 5 to 65% by weight based on the total amount of the composition of the light-emitting portions.

2. The artificial stone molded product of claim 1, wherein the luminous or fluorescent material has the luminescence.

3. The artificial stone molded product of claim 1, wherein the aggregate of the transparent inorganic material is a glass, quartz or silica rock.

4. The artificial stone molded product of claim 1, wherein the resin is a methacrylic resin.

5. The artificial stone molded product of claim 1, wherein the ratio of the aggregate of the inorganic material is between 89 and 95% by weight based on the weight of the molded product, and the ratio of the resin is between 5 and 11% by weight based on the weight of the molded product.

6. The artificial stone molded product of claim 1, wherein the aggregate of the inorganic material comprises a fine powder component having a size of from 5 to 70 mesh, and a finely divided component having a size of smaller than 100 mesh.

7. The artificial stone molded product of claim 6, wherein in the light-emitting portions, at least a part of the fine powder component contained is a fine powder component of a transparent inorganic material, and at least a part of the finely divided component is a luminous or fluorescent material.

8. The artificial stone molded product of claim 6, wherein in the light-emitting portions, at least a part of the fine powder component contained is a transparent inorganic material having a surface baked with a luminous or fluorescent material.

9. The artificial stone molded product of claim 6, wherein the weight ratio of the fine powder component to the finely divided component is between 1:1 and 4:1.

10. The artificial stone molded product of claim 8, wherein the thickness of the surface baked with the luminous or fluorescent material is between 5 and 50 $\mu$m.

11. A process for producing an artificial stone molded product in which protrusions for a figure or a pattern are integrally provided on a flat surface of a substrate, a main composition of the stone molded product comprises an aggregate of an inorganic material and a resin, and at least a part of the protrusions are luminous or fluorescent light-emitting portions, so that the light-emitting portions are present only in said protrusions, which comprises injecting a mixture for resin molding containing an aggregate of a transparent inorganic material having a surface baked with a luminous or fluorescent material, having a luminescence or a luminousness accompanied by ultraviolet absorption, as at least a part of the aggregate of the inorganic material into grooves formed in an inner bottom surface of a mold and which correspond to the protrusions of the molded product, then injecting a mixture for resin molding containing an aggregate of an inorganic material into the mold, curing the mixture, and withdrawing the product from the mold, wherein the aggregate of the transparent inorganic material baked with the luminous or fluorescent material is contained in the light-emitting portions at a ratio of from 5 to 65% by weight based on the total amount of the composition of the light-emitting portions.

12. A process for producing an artificial stone molded product in which embedded grooves for a figure or a pattern are integrally provided in a flat surface of a substrate, a main composition of the stone molded product comprises an aggregate of an inorganic material and a resin, and luminous or fluorescent light-emitting portions are embedded in at least a part of said embedded grooves, so that the light-emitting portions are present only in said embedded grooves, which comprises injecting a mixture for resin molding containing an aggregate of an inorganic material into protrusions formed in an inner bottom surface of a mold and corresponding to the embedded grooves of the molded product, curing or half-curing the mixture, withdrawing the product from the mold, injecting a mixture for resin molding containing an aggregate of a transparent inorganic material having a surface baked with a luminous or fluorescent material, having a luminescence or a luminousness accompanied by ultraviolet absorption, as at least a part of the aggregate of the inorganic material into grooves formed in the surface of the molded product, and curing the mixture, wherein the aggregate of the transparent inorganic material baked with the luminous or fluorescent material is contained in the light-emitting portions at a ratio of from 5 to 65% by weight based on the total amount of the composition of the light-emitting portions.

13. An artificial stone molded product in which protrusions or embedded grooves for a figure or a pattern are provided integrally on or in a flat surface of a substrate, and a main composition of the stone molded product comprises an aggregate of an inorganic material and a resin, wherein at least a part of said protrusions or embedded grooves are luminous or fluorescent light-emitting portions which contain a luminous or fluorescent material having a luminescence or a luminousness accompanied by ultraviolet absorption and an aggregate of a transparent inorganic material, as at least a part of the aggregate of the inorganic material, wherein the weight ratio of the luminous or fluorescent material and the aggregate of the transparent inorganic material in the light-emitting portions is from 1:2 to 1:10 and the total amount of both of them is between 80 and 95% by weight based on the total amount of the composition of the light-emitting portions, and wherein only said protrusions or said embedded grooves of said substrate have paid light-emitting portions.

14. The artificial stone molded product of claim 13, wherein the luminous or fluorescent material has the luminescence.

15. The artificial stone molded product of claim 13, wherein the aggregate of the transparent inorganic material is a glass, quartz or silica rock.

16. The artificial stone molded product of claim 13, wherein the resin is a methacrylic resin.

17. The artificial stone molded product of claim 13, wherein the ratio of the aggregate of the inorganic material is between 89 and 95% by weight based on the weight of the molded product, and the ratio of the resin is between 5 and 11% by weight based on the weight of the molded product.

18. The artificial stone molded product of claim 13, wherein the aggregate of the inorganic material comprises a fine powder component having a size of from 5 to 70 mesh, and a finely divided component having a size of smaller than 100 mesh.

19. The artificial stone molded product of claim 18, wherein in the light-emitting portions, at least a part of the fine powder component contained is a fine powder component of a transparent inorganic material, and at least a part of the finely divided component is a luminous or fluorescent material.

20. The artificial stone molded product of claim 18, wherein in the light-emitting portions, at least a part of the fine powder component contained is a transparent inorganic material having a surface baked with a luminous or fluorescent material.

21. The artificial stone molded product of claim 18, wherein the weight ratio of the fine powder component to the finely divided component is between 1:1 and 4:1.

22. The artificial stone molded product of claim 20, wherein the thickness of the surface baked with the luminous or fluorescent material is between 5 and 50 $\mu$m.

23. A process for producing an artificial stone molded product in which protrusions for a figure or a pattern are integrally provided on a flat surface of a substrate, a main composition of the stone molded product comprises an aggregate of an inorganic material and a resin, and at least a part of the protrusions are luminous or fluorescent light-emitting portions, so that the light-emitting portions are present only in said protrusions, which comprises injecting a mixture for resin molding containing a luminous or fluorescent material having a luminescence or a luminousness accompanied by ultraviolet absorption and an aggregate of a transparent inorganic material as at least a part of the aggregate of the inorganic material into grooves formed in an inner bottom surface of a mold and which correspond to the protrusions of the molded product, then injecting a mixture for resin molding containing an aggregate of an inorganic material into the mold, curing the mixture, and withdrawing the product from the mold, wherein the weight ratio of the luminous or fluorescent material and the aggregate of the transparent inorganic material in the light-emitting portions is from 1:2 to 1:10 and the total amount of both of them is between 80 and 95% by weight based on the total amount of the composition of the light-emitting portions, and wherein only said protrusions of said substrate have said light-emitting portions.

24. A process for producing an artificial stone molded product in which embedded grooves for a figure or a pattern are integrally provided in a flat surface of a substrate, a main composition of the stone molded product comprises an aggregate of an inorganic material and a resin, and luminous or fluorescent light-emitting portions are embedded in at least a part of said embedded grooves, so that the light-emitting portions are present only in said embedded grooves, which comprises injecting a mixture for resin molding containing an aggregate of an inorganic material into protrusions formed in an inner bottom surface of a mold and corresponding to the embedded grooves of the molded product, curing or half-curing the mixture, withdrawing the product from the mold, injecting a mixture for resin molding containing a luminous or fluorescent material having a luminescence or a luminousness accompanied by ultraviolet absorption and an aggregate of a transparent inorganic material as at least a part of the aggregate of the inorganic material into grooves formed in the surface of the molded product, and curing the mixture, wherein the weight ratio of the luminous or fluorescent material and the aggregate of the transparent inorganic material in the light-emitting portions is from 1:2 to 1:10 and the total amount of both of them is between 80 and 95% by weight based on the total amount of the composition of the light-emitting portions, and wherein only said embedded grooves of said substrate have said light-emitting portions.

* * * * *